Patented July 3, 1934

1,964,740

UNITED STATES PATENT OFFICE 1,964,740

HEAT INSULATING MATERIAL AND METHOD OF MANUFACTURING SAME

Henry R. Minor, Oak Park, Ill., assignor to The Liquid Carbonic Corporation, Chicago, Ill., a corporation of Delaware No Drawing. Application December 13, 1932, Serial No. 647,001

6 Claims. (Cl. 18—53)

The present invention relates to a new material for use as a heat insulation, as for example in the lining of refrigerators and dwellings and whenever a light, strong and economical material is desired for the purpose. The material will also have other and varied uses.

The heat insulating material herein disclosed will be composed of a highly developed, rigid cellular structure in which the cells are practically uniform and are regularly distributed throughout the mass. It is substantially lighter than cork and resembles the usual sponge rubber in structure, being made in somewhat the same manner that sponge rubber is made except that the vulcanization is carried to the point where the rubber is hard and unyielding. So far as known to me, the process of manufacture is new, it having been impossible heretofore to secure the results obtained by any of the known methods of manufacturing that material. The resultant product is free of all odors so that it can be successfully used in refrigerators and dwelling houses. It can be made in uniform bricks or blocks or can be made in large slabs which can be cut to size. The material can be subjected to certain pressure without danger of fracture or cracking, and can be sawed. Nails may be driven into the material and it will have many of the usual workable properties of wood or fiber board.

The material is composed of a rubber which is compounded in the usual manner with any of the well known compounding agents and vulcanizing ingredients which will give a hard rubber on complete curing. A batch of rubber, compounded for vulcanization, is subjected to an atmosphere of carbon dioxide gas at relatively low pressures until the rubber has absorbed a sufficient quantity of the gas. The block of rubber is treated in a mold or press cavity which is of considerably greater volume than the block of rubber. The gas pressure is then diminished and the gas entrapped within the rubber will act as a blowing ingredient expanding the mass by the formation of a multitude of small cells thoroughly and completely disseminated through the mass. The expanded mass is then subjected to heat at the requisite temperature and for the period necessary to vulcanize the rubber to its hard rubber form.

During vulcanization the process may be interrupted when the rubber has acquired a more or less permanent set, so that it is in the condition of the usual soft cured rubber sponge, and after being removed from the mold or press the cells may be broken down by passing the rubber through the usual breaking down rolls. The rubber is then replaced in the mold or press and the curing completed. This cell-breaking step is not essential, however, and the curing operation may be carried through without interruption.

If the cells are not broken down the subsequent diffusion of air throughout the rubber mass and the replacement of the carbon dioxide will take place more slowly, but in any event a sufficient residue of carbon dioxide will always remain in the mass which will aid in preventing any future set up of odors. The diffusion of the gas into the atmosphere carries away with it much of the odor which might have developed in the cure.

Hard sponge like material made in the manner described will age perfectly, there being little or no shrinkage in aging.

The usual practice for making sponge rubber has been to compound the rubber with some blowing agent which will decompose during the vulcanization. This requires excessive milling which, by destroying the nerve of the rubber, will reduce its tensile strength and will give poor aging characteristics which makes such sponge rubber inadaptable for the uses here contemplated. By the process described the milling may be and is preferably discontinued when the compound reaches its optimum condition for high tensile and superior aging.

The product secured by the process herein described is noteworthy because of the greater uniformity in size of the cells throughout thicker pieces of sponge rubber than it has been possible to secure heretofore. This makes the resultant product much superior and more easily workable than former products of a similar nature. The cell structure does not have to be broken down to prevent shrinkage which occurs with the usual rubber sponge.

The product may be cured in any sort of vulcanizing apparatus and may be cured in an atmosphere of hot $CO_2$ gas at sufficient pressure, such for example as ten pounds, so as to prevent the loss of pressure of the gas within the rubber. The rubber may be successfully impregnated and completely permeated by $CO_2$ gas at low pressures, such as are easily and commercially practicable, very satisfactory results having been secured at as low as 200 pounds pressure, and the impregnation is carried on while the rubber is at normal room temperature.

The uniformity and size of the cells is substantially controllable by the release of the pressure at a predetermined and uniform rate. The degree to which the pressure is released before vulcanization also affects the structure of the material and it is possible by varying the periods, pressures and rates of release to secure all sizes of cells from microscopic cells to cells the size now usually found in the ordinary bath sponge, except as this may be effected and controlled by the size of the original stock placed in the mold.

In carrying out the manufacture of this material, the usual or available rubber, such as pale crepe, is compounded with sulphur, any of the usual compounding ingredients and an accelerator. The character of the accelerator and its behavior during cure is important to the successful carrying out of the process, as will be explained. The rubber is milled sufficiently to secure the proper compounding, but, as stated above, it is preferably stopped when the optimum conditions are secured and before the nerve of the rubber is destroyed so that it retains its maximum tensile strength and aging qualities.

A block of rubber is placed in a mold or press cavity, the volume of the rubber being a fractional part of the volume of the mold cavity, so that the rubber will expand in the subsequent operations. The cavity is closed around the rubber and $CO_2$ gas is admitted to the interior thereof at the desired pressure, and while the rubber is maintained at normal temperature. For securing the proper penetration of the gas into the mass of rubber, cylinder pressures of 850 pounds or less have been successfully employed. The rubber is kept under pressure for a sufficient period to afford opportunity for the $CO_2$ gas to penetrate thoroughly and permeate the rubber. For example $CO_2$ gas may be employed at 200 pounds pressure and kept under that pressure for twelve hours. At higher pressures the time may be shortened and the factors of time and pressure may be governed and determined by conditions, by the size of the rubber mass and by other factors.

Almost immediately upon release of the pressure the expansion of the rubber will take place to fill the cavity, with the consequent formation of the cells within the rubber. The release of pressure should be moderate and uniform to secure the desired results. For example in using pressures of 200 pounds or thereabouts the pressure should be reduced to zero in about a minute. It may be desirable to release the pressure only partially, certain advantages being secured by releasing the pressure to an intermediate point.

After the pressure has been released and the expansion of the rubber secured in any of the ways described or suggested, it is advisable to permit the rubber to stand for an interval, or to give the rubber a rest period before vulcanization, this being found to have beneficial effects upon the aging and tensile characteristics of the cured product. The rubber is now ready to be cured, but preparatory to applying the heat for vulcanization, the mold should be opened or the pressure released momentarily to permit the escape of any trapped gases on the exterior of the rubber mass.

The material is now ready to be vulcanized to complete hardness and in connection with the curing it should be observed that the character of the accelerator is a considerable factor in the success of the process. The accelerator should not be characterized by delay of its action, but should be one which gives an even and uniform cure throughout the whole process, and in addition it should set the stock up at a relatively low temperature. Of several commercial accelerators on the market at the present time, that known by the commercial name of "Captax" which is the trade name for 2-mercapto-benzo-thiazole, has been found to be suitable, although other accelerators having similar properties and behavior characteristics may be employed. By the use of an accelerator of the type set forth, the stock is set up almost immediately so that loss of pressure or breakdown of the cells is avoided. The structural characteristics of the finished product will be fixed at approximately 220° F.

It will be apparent that, having fully described and disclosed the process, variations and modifications may be made within the scope of the invention, and the claims are not to be considered as limited to the details of the process as set forth herein but are of sufficient breadth to cover improvements and changes in detail, all within the scope of the basic invention set forth. While $CO_2$ gas has been specifically mentioned, and while this gas has been found to give superior results, it is not necessary that pure $CO_2$ gas be used.

What is claimed is:

1. The process of manufacturing a cellular heat insulating material having the properties described comprising compounding a mass of rubber for vulcanization to produce a hard rubber with an accelerator which will cause the rubber to set promptly upon the application of heat, subjecting a body of such rubber compound to the action of carbon dioxide gas at relatively low pressure and for a sufficient period to obtain penetration of the gas throughout the rubber mass, releasing the pressure and permitting the rubber to expand under the influence of the entrapped gas and vulcanizing the mass to a hard rubber.

2. The process of manufacturing a cellular heat insulating material of the character described comprising subjecting a mass of rubber compounded for vulcanization to produce a hard rubber to an atmosphere of a carbon dioxide containing gas at relatively low pressure, permitting the mass to remain in that atmosphere until the gas is absorbed by the rubber, releasing the pressure over an interval of time sufficient to allow the gas cells pocketed within the rubber to expand uniformly, permitting the expanded rubber to stand for a rest interval, and subjecting the cellular mass thus obtained to vulcanizing temperature for a sufficient period to convert the mass into a cellular block of hard rubber.

3. The process of manufacturing a cellular heat insulating material of the character described comprising subjecting a mass of rubber compounded with sulphur and 2-mercapto-benzo-thiazole for vulcanization to a hard rubber to an atmosphere of carbon dioxide gas at relatively low pressure, permitting the mass to remain in that atmosphere until the gas is absorbed by the rubber, releasing the pressure over an interval of time sufficient to allow the gas cells pocketed within the rubber to expand uniformly, permitting the expanded rubber to stand for a rest interval, and subjecting the cellular mass thus obtained to vulcanizing temperature for a sufficient period to convert the mass into a cellular block of hard rubber.

4. The process of manufacturing an insulating material, comprising compounding a mass of rubber capable of being vulcanized to a hard rubber and containing an accelerator which will cause the stock to set up quickly and at low temperature, subjecting the mass to a surrounding atmosphere of carbon dioxide gas at cylinder pressures approximately 850 pounds and for a period sufficient to secure absorption of the gas by the stock, releasing the pressure at a predetermined rate sufficient to secure uniform expansion of the gas cells within the rubber and vulcanizing the rubber for a sufficient period to cause it to form a hard cellular mass.

5. The process of manufacturing a rigid, cellular heat insulating material having the properties set forth comprising subjecting a mass of rubber compounded for vulcanization to produce a hard rubber to a surrounding atmosphere of carbon dioxide gas for a sufficient interval to secure absorption of the gas within the mass of rubber, releasing the pressure at a predetermined rate to secure uniform blowing of the mass, and subjecting the mass so formed to vulcanizing temperature for a period sufficient to vulcanize it to the hard rubber stage.

6. The process of manufacturing a rigid cellular heat insulating material having the properties set forth comprising subjecting a mass of rubber compounded for vulcanization to produce a hard rubber to a surrounding atmosphere of a carbon dioxide containing gas to secure absorption of the gas within the mass of rubber, diminishing the pressure to secure the expansion of the mass and the formation of a multitude of cells therein and vulcanizing the mass to its hard rubber stage.

HENRY R. MINOR.